Aug. 23, 1966 J. W. MILLER 3,268,028
METHODS AND APPARATUSES FOR SEISMIC EXPLORATION
Filed April 18, 1963 3 Sheets-Sheet 2
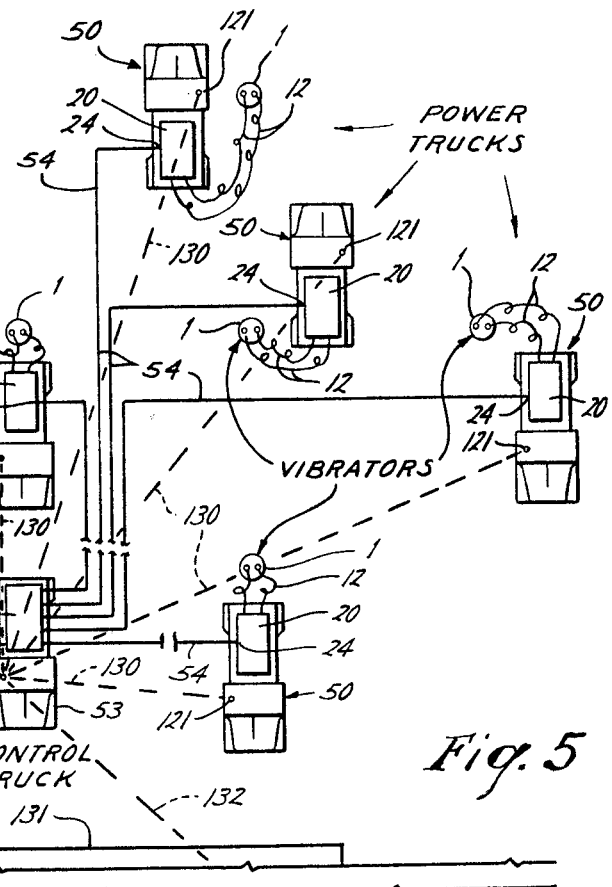
*Fig. 5A*
SEISMIC TRANSMITTER ASSEMBLY
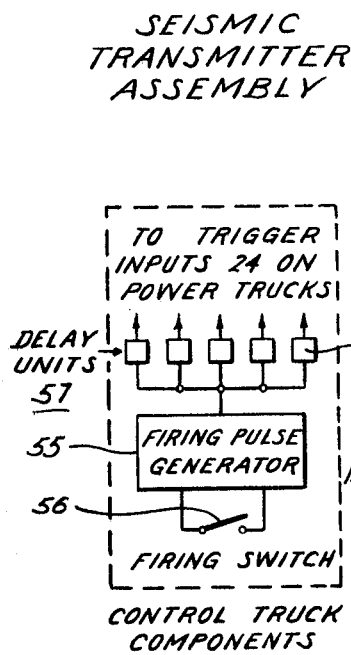
CONTROL TRUCK COMPONENTS
*Fig. 5B*
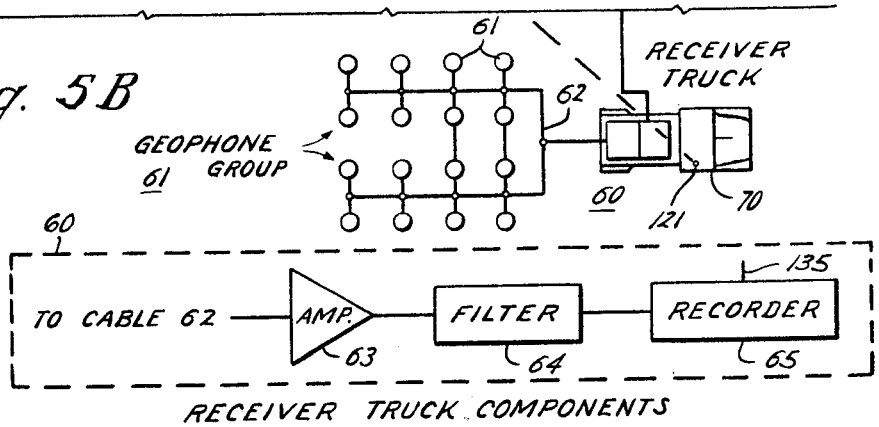
RECEIVER TRUCK COMPONENTS
SEISMIC RECEIVING ASSEMBLY
John W. Miller
INVENTOR.
BY Arnold, Roylance
& Harris
ATTORNEYS Aug. 23, 1966       J. W. MILLER       3,268,028
METHODS AND APPARATUSES FOR SEISMIC EXPLORATION
Filed April 18, 1963       3 Sheets-Sheet 3

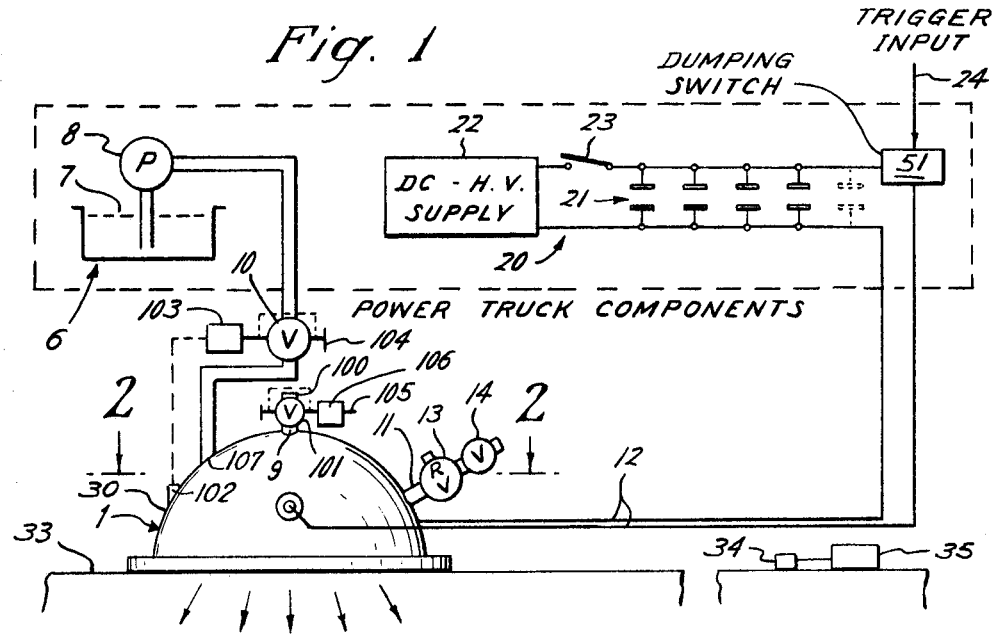
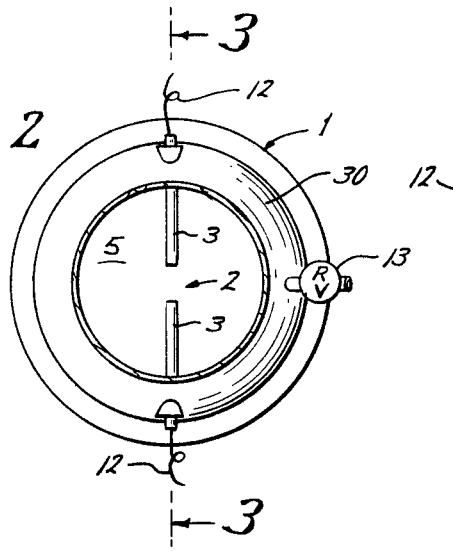
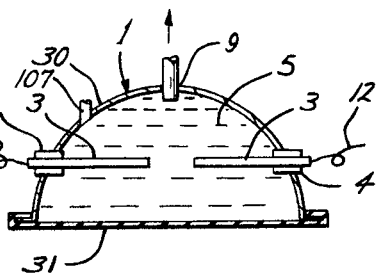

John W. Miller
INVENTOR.

BY Arnold, Roylance
  & Harris
  ATTORNEYS

United States Patent Office 3,268,028
Patented August 23, 1966

3,268,028
METHODS AND APPARATUSES FOR SEISMIC EXPLORATION
John W. Miller, Midland, Tex., assignor, by mesne assignments, to Shell Oil Company, New York, N.Y., a corporation of Delaware
Filed Apr. 18, 1963, Ser. No. 273,967
9 Claims. (Cl. 181—.5)

The present invention relates to the art of locating oil and identifying the nature of underground structures. I have developed improved apparatuses and methods that have proved to be both practical and highly advantageous.

A brief description of the contemporary apparatuses and methods will be helpful to this presentation.

A major amount of seismic exploration is carried out at the present time by using either the "thumper" (weight drop) or dynamite to create the seismic impulse in the ground. Depending on the nature of the ground, one or more "thumps" or "shots" must be used to create enough energy to readily distinguish the horizon reflections from noise. The seismic signals from repeated shots are added together to increase the signal-to-noise ratio.

The thumper consists of a weight suspended from a truck and for each shot the vehicle must move to a new location, raise the weight and stop before the weight is dropped. While the thumper operates rapidly and is guide mobile, it is well-known that severe timing problems occur in trying to add together the received seismic signals from several shots. The timing control for dropping the weight must come from the recorder at the beginning of a recording cycle and many factors introduce possible variable time delays before the weight actually introduces a pressure wave into the ground. Thus onset, which is the rise of the pressure impulse, cannot be easily controlled, and without a precise onset the addition of the received seismic signals by the recorder is not as effective as it could be.

Another characteristic of the thumper is that a number of these devices cannot be operated simultaneously to build up the energy transmitted into the ground. Such simultaneous operation would be very desirable for increased efficiency.

The final characteristic of the thumper that will be mentioned is the nature of the seismic impulse. High frequencies are especially useful in shallow prospecting and the impulse produced by the thumper is often lacking in adequate high frequency content.

In contrast to the thumper, the use of dynamite produces an accurately controlled onset and greater energy per shot. Dynamite has the disadvantage, however, of being an explosive. The danger in handling dynamite frightens many people; landowners are frequently reluctant to give permission to survey their land. In addition, the dynamite damages the land to some extent, due to the blast and the need for digging a detonating hole. Obviously, surveying in sites and near communities cannot be conveniently accomplished by dynamite. And, of course, the loading and tamping of dynamite takes time and extreme care, plus an extensive amount of drilling equipment.

My invention exhibits many of the desirable features mentioned above and does not have several of the aforementioned limitations, and has proven to be a very practical approach to seismic surveying.

More particularly, my invention has for its object to provide compact, efficient and rapidly operating apparatuses and methods for seismic exploration.

The improvements include the use of apparatus that is completely mobile, for rapid movement to new shot locations; the precise control of the seismic impulse onset and amplitude character to improve the addition of received seismic signals; adequate high frequency content in the seismic impulse; accurate control of more than one seismic impulse producing apparatus for simultaneous operation; minimum damage to the ground and no inherent danger in the use of the apparatus; and minimum time delay between successive shots when shots are repeated in the same effective location.

These and other objects and advantages of the present invention will become apparent from the following description of several preferred embodiments. These embodiments are merely presented as examples in accordance with the requirement of the patent statutes. It must be recognized that the specific terminology or construction may take several forms without departing from the teaching of my invention as defined in the appended claims.

In accordance with the methods and apparatuses of the present invention a seismic impulse is produced by a pulser having an exploding electric plasma firing device coupled to the ground. Either simultaneous or successive firings of one or more pulses can be precisely controlled by the recording means for accurate recording and adding of the received seismic signals. The exploding electric plasma firing device can utilize a spark discharge or an exploding wire discharge. Each pulser can be mounted on a separate vehicle with almost all the accessory power equipment, including a radio to receive a firing signal from a control means and means to manipulate the pulser into firing position with the weight of the vehicle furnishing a large part of the engaging force for the pulser for maximum energy coupling to the ground.

In the following description reference is made to the attached figures listed below, wherein the same reference numeral is used for the same component appearing in various figures:

FIG. 1 is an elevation view of one type of a pulser for producing a seismic impulse with the accessory equipment shown schematically;

FIG. 2 is a horizontal section along the line 2—2 of FIG. 1, showing a spark gap exploding electric plasma firing device inside the pulser housing;

FIG. 3 is a vertical section taken on the line 3—3 of FIG. 1;

FIG. 4 is a section similar to FIG. 3 but showing another embodiment of a pulser having an exploding wire electric plasma firing device;

FIG. 5 is a schematic plan view layout of a typical seismic transmitting and receiving assembly on the ground ready for operation, with several of the component parts of the assembly further shown in FIGS. 5A and 5B;

FIG. 6 is a schematic circuit diagram of one embodiment of a system for initiating and recording seismic impulses;

FIG. 7 is one embodiment of a vehicle suitable for transporting and manipulating a seismic impulse producing device arranged in accordance with my invention; and FIG. 8 is a diagrammatic plan view of a possible arrangement of the equipment during use.

*Detailed description of preferred embodiments*

Important features of the invention are the unique control of the seismic impulse characteristics for simultaneous or successive pulser shots and the ease with which the seismic surveying system is set up. Each pulser can be reused in a short time for another shot, and several of the pulsers can be controlled from one master recording unit for simultaneous or successive firing.

In general, the precise control and reproducibility of the seismic impulse is provided by an exploding electric plasma firing device. The energy from an electric firing device is concentrated and efficiently coupled to the ground. High speed electronic techniques can be used to store the high energy and control the onset of the impulse. The exploding electric plasma firing means can take two basic forms, either utilizing the energy from the discharge of a spark gap or an exploding wire. The spark gap phenomena has been fairly extensively analyzed in the literature and the energy therefrom is tremendous, like a lightning bolt, when properly controlled and concentrated. The exploding wire phenomena has been studied but it is not completely understood. Nevertheless, actual use of both electric firing means in seismic exploration has clearly demonstrated their practicality. In fact, the exploding wire proves to be more efficient than the spark gap, but each form is capable of improving the basic apparatus and methods of seismic exploration.

One embodiment of a pulser is shown in FIGS. 1 through 3, identified by reference number 1. This embodiment utilizes an exploding electric plasma firing device that includes two spaced steel, non-corrodible electrodes 3 separated by a gap 2 (FIGS. 2 and 3) and disposed in a relatively incompressible fluid 5, such as water with some salt added, enough to improve its conductivity but not enough to make the fluid a better conductor than the electrodes 3. The electrodes 3 are mounted in heavy metal dome shaped housing 30, supported in electrical insulators 4 (FIG. 3). Current is supplied to the electrodes 3 by cables 12. A flexible rubber like diaphragm 31 closes the open face of housing 30 and is attached thereto in fluid tight relation to retain the fluid 5 within housing 30.

The housing 30 can be supplied with fluid by a pumping system 6 (FIG. 1), comprising reservoir 7 and pump 8 connected to an inlet pipe 107 at the side of housing 30 through a valve 10. The pump 8 creates a continuous pressure to resupply fluid to housing 30 when valve 10 is opened. The housing 30 also has an outlet pipe 11, that mounts a relief valve 13 and a flow valve 14. Air is released from housing 30 through an exhaust port 100, controlled by valve 101, which is connected to the housing through an exit 9.

The pressure housing 30 can be measured by gauge 102 and a signal therefrom can automatically control the valve 10, through a conventional actuator 103 to maintain a high fluid pressure in housing 30. The valve 10 can be manually operated by handle 104. In addition, the exhaust valve 101 can be automatically opened for a moment after each shot by a control signal from the master recording unit (not shown) at input 105 of actuator 106 to discharge fluid through the port 100.

The pulser 1 is energized by supplying a high electric current to exploding electric plasma firing device from a power supply means 20 to form a spark at the gap 2. A D.C. current of several thousand amperes, lasting for several microseconds is delivered from storage capacitor bank 21, charged by D.C. H.V. (high voltage) source 22 when switch 23 is closed. The transfer of the energy from capacitor bank 21 to the exploding electric plasma firing device 2 is controlled by an electronically triggered dumping switch 51, preferably an electronic device such as an ignitron. The dumping switch 51 has an input 24 that receives a firing signal originating (timed) from recorder 35 at the beginning of a recording cycle to activate the dumping switch 51 and thereby connect the capacitor bank 21 across the exploding electric plasma firing device gap 2 through cables 12. The cables 12 are kept as short as possible to reduce the inductance and resistance of the path for the high current.

When the high electrical current passes to the exploding electric plasma firing device gap 2, there is a tremendous electrical discharge across the gap between electrodes 3. The electrical discharge creates a pressure impulse that is concentrated by the housing 30 toward the pad 31, and transferred to the ground 33 as an energy pulse. The impulse wave contains frequencies from a D.C. to several hundred cycles per second (c.p.s.), considered high frequencies in seismic work. The frequency content of the impulse is similar to a dynamite generated pulse and can be picked up by geophones 34 coupled to conventional amplifying and recording equipment 35, as described hereinafter.

Th capacitor bank 21 can be recharged very rapidly, in seconds if desired, to correspond with the repetition of the recording cycle, to fire the pulser 1 repeatedly.

The fluid input valve 10 and outlet valves 14 and 101 are closed during firing, and valve 13 opens only if the pressure in the housing 30 exceeds the safe limit. This is an extra precaution since the diaphragm 31 also acts as a safety valve.

The housing 30 is of sturdy construction and some embodiments are 750 to 10,000 pounds heavy. Accordingly, the pressure impulse does not overcome the inertia of the housing, preventing lift-off from the ground. In addition, a mechanical hold down (not shown in FIG. 1) can be used, cushioned with shock absorbers to substantially eliminate any movement of housing 30.

As mentioned previously, the pulser 1 can operate quite satisfactorily by simply relying on the weight of pulser housing. However, the energy coupled to the ground can be increased by firmly engaging the ground before firing and maintaining a fairly substantial holddown force on housing 30. I have found through use of the invention that an increase on the order of at least 2-to-1 is obtained by proper weight loading of the pulser 1. One method for accomplishing this weight loading is practiced by having the pulser and its accessory equipment mounted on a vehicle, such as shown in FIG. 7, the pump 6 and power supply means 20 being symbolically represented by the blocks bearing these reference numerals.

The method for weight-loading a pulser carried by a transport, such as wheeled vehicle 110 in FIG. 7, may comprise the steps of first lifting the front and back ends of vehicle 110 off the ground 111, so that the vehicle body weight is carried by lifting means, such as a front jack 112 and a rear jack 113. These jacks can be separately installed, like car jacks, or can be integral with the vehicle 110 and automatically controlled by hydraulic means through a switch (not shown) in the vehicle cab. The vehicle wheels may or may not lift off the ground. The housing 30 is manipulated to a position below the vehicle body and the vehicle body is lowered on the housing 30, whereby substantially all the vehicle body weight is applied to housing 30. A firm engagement with the ground is achieved and the housing 30 has no uplift, thereby increasing the energy coupled to ground 111.

In the vehicle 110 of FIG. 7 the housing 30 fits into a dome shaped recess 114 in the vehicle bottom and is extended toward ground 111 by a hydraulic actuator 115, including a pressure source pump and appropriate controls, all generally designated as 116, that control piston 117 in cylinder 118. The housing 30 is attached to the lower end of piston 117 and moves to an extended position outside recess 114 and is rigidly held there throughout the pulser firings. The location of housing 30, whether fully extended or in recess 114 is monitored by a sensor 120 that operates a light on the driver's control panel (not shown) to indicate the pulser is ready for firing or fully retracted. The vehicle 110 can have a radio transmitter and receiver, of which only antenna 121 is illustrated in FIG. 7, to transmit a signal indicating the pulser is ready to fire, interlocks being provided to prevent firing if the capacitor bank 21 is not fully charged or housing 30 is not fully extended. The vehicle radio can also be used to receive a firing signal that triggers dumping switch 51, and transmits a ready signal to a control truck.

The vehicle 110 can be self-powered and can operate in very rough terrain. Further, lifting the vehicle, extension of housing 30, and dropping of the vehicle to weight down the housing 30 can all be automatically arranged and the reverse process can be automatic, for a rapid movement of the vehicle 110 to new shot locations.

It can be seen that the pulser 1 is capable of precise control, through the electronically dumping switch 51. This feature enhances use of the pulser 1 with various geophysical exploration methods and especially in the combination of pulsers to increase the magnitude of the seismic wave introduced into the ground.

FIG. 4 illustrates another embodiment of a pulser designated generally by reference number 40. The pulser 40 has a housing 41, dome shaped generally as housing 30 and an exploding electric plasma firing device 42 disposed in fluid 5, the same general type of fluid as described for vibrator 30. Diaphragm 31 and cables 12 are also the same as in the embodiment of FIG. 1. The exploding electric plasma firing means 42 includes wire 43, made of aluminum or other good conductive metal, supported in electrical insulators 44 and connected to cables 12. The wire 43 carries the high electrical current from capacitor bank 21 and explodes into a plasma discharge, because of the intense heat and other conditions produced by the current, to create a pressure impulse in fluid 5 that is transmitted through diaphragm 31 to the ground. The wire 43 can be replaced, access being gained through the port which is normally closed by a closure 45 at the top of housing 41, the closure being secured by lock members 46. Alternatively, the wire 43 can be automatically fed into firing position by a wire feeding mechanism (not shown) cooperating with automatically operated electrical insulator clamps (not shown).

A greater seismic impulse is produced for a given amount of electrical energy by the exploding wire form of the exploding electric plasma firing device than the spark gap discharge. The onset is rapid and the frequency spectrum is wide with considerable high frequencies; the seismic impulse is repeatable at relatively short intervals with uniform onset and waveform.

Either of pulsers 1 or 40 previously described can be used to improve the operation of seismic exploration methods. The pulsers can be grouped relatively close together and fired from a single control point, either simultaneously to multiply the energy transmitted to the ground as if effectively coming from a single pulser, or fired successively from different locations to investigate a particular horizon in the ground, or to receive separate reflections from the horizon that can be added. An example of one system arrangement in which either pulser 1 or 40 may be used is shown in FIG. 5, pluser 1 being used in this instance.

The equipment is mounted on trucks, such as illustrated in FIG. 7, for convenience. Each pulser 1 has a separate power source 20 which is mounted on a power truck 50. The dumping switch input 24 of each power source 20 is in communication with a control means 52 on control truck 53 by suitable means such as cables 54, or a radio link 130 to receive a firing signal. Suitable radio transmitting and receiving equipment is located in control truck 53 and power trucks 50 (only the antenna 121 is shown).

The receiving means 60 can take several forms, the geophones 61 in FIG. 5 being connected in parallel at the receiving location and coupled by cable 62 to receiver truck 70 that houses the receiving equipment. Additional patches of geophones are used (not shown) with separate input cables. As appears in FIG. 5B, the receiving means 60 includes, for each geophone patch, a wide band amplifier 63 coupled to cable 62 for its input. The output of the amplifier 63 is selectively transferred by a filter 64 to a multi-track recorder 65. The reference firing signal that occurs at the beginning of a recording cycle appears at output 135 of recorder 65.

The control means 52 can fire pulsers 1 simultaneously upon receiving a reference firing signal from the recorder 65 on control truck 70, carried over cable 131, or alternatively by radio link 132 to control truck 53. The reference firing signal is initiated by the beginning of each recording cycle. The simultaneous firing can be repeated and the received seismic signal recorded on a separate recording track in precise relation to the initial shot. The variable delays between the reference signal and the actual creation of the seismic impulse are eliminated and no compensation is required. The initial and repeat shots can be added without correction to increase the signal-to-noise ratio.

The pulsers 1 can be controlled to perform more sophisticated methods by the arrangement shown in FIG. 5A which is a part of control means 52. Each pulser 1 can be separately controlled to fire at a particular time. A time delay is introduced by delay units 57 after firing switch 56 is closed and a firing signal leaves firing pulse generator 55. The pulsers 1 can be arranged in a particular pattern and sequentially fired. For example, the pulsers 1 can be successively fired to explore a particular horizon, computing the time delay necessary in the spaced pulsers to have unified inclined waveform, so that the impulses integrate in the ground.

As a further example, the pulsers 1 can be disposed in line above a horizon with a receiving means, as indicated in FIGURE 8. One pulser, or a group of closely spaced pulsers can be fired simultaneously and the received seismic signal recorded on one track. Then another pulser or group of pulsers spaced from the initially fired pulsers can be fired simultaneously with a delay in respect to the recorder reference firing signal that compensates for the different travel path lengths to another receiver means positioned to pickup the seismic signal from the same horizon. Such methods are described in U.S. Patent No. 2,732,906, and the present invention has proved highly advantageous in these methods.

The recorder 65 is capable of separately recording the received seismic signals for later correction and/or addition, or addition can occur as the recording takes place. The present invention eliminates any need to correct for variables in the creation and transmission of the seismic impulse to the ground.

In the illustrative example of FIG. 8, the power trucks 50 are parked and the pulsers 1 are placed in an area 140, essentially in a straight line that is transverse to the line to the geophones, i.e., represented by a vertical column as viewed in FIG. 6. The geophone groups 61, 61' and 61" are disposed in line from the pulsers 1 and have their outputs connected to separate amplifier channels in amplifier 141. The recording takes place on multichannel drums 142 and 143 having several endless parallel magnetic recording tracks and record-playback heads 144. The drums 142 and 143 rotate on a common shaft 147 driven at a constant speed. The reference firing signal is produced by a switch 145 operated by a cam that rotates with drum 142 to furnish a reference point, termed the beginning of the recording cycle, on the recorder. A shot is commenced by first closing the switch 155 connecting switch 145 to control means 52. When the drums rotate to the reference position switch 145 closes; control means 52 sends out a firing signal through radio means 146 to the power trucks 50. All the pulsers can fire simultaneously, the seismic impulses integrating in the ground to form effectively a single seismic impulse reaching the geophone groups.

The recording process can take several forms, the arrangement shown having great flexibility. The received seismic signal from each geophone group is amplified in separate channels in amplifier 141 and passed through a separate switch channel in switch-mixer 148 through a separate modulator channel of modulator-demodulator 149, to a separate drum channel on one of drums 142 or 143. FM or AM modulation can be used. Another firing signal is sent out after the power trucks move to a new location at 150, in which the pulsers have the positions 1', close enough to location 140 to have the seismic impulses effectively come from one point, as seen by the receiving means. The received seismic signals from this repeat shot are switched by switch-mixer 148 to the other drum, while the first recorded signals are combined through the mixer of switch-mixer 148 with the recording signal for each respective channel. Thereafter a firing signal is sent with the pulsers positioned as shown at 1''. The received seismic signals from one geophone group for successive shots can be added in this manner, back and forth between a channel on one drum and a channel on the other drum, until enough signals have been recorded to amply accentuate repetitious signals. Successive shots can be made in this manner in an area of dimension of say 400 feet by 400 feet to substantially increase the signal-to-noise ratio.

As an alternative, the received seismic signals for each geophone group can be recorded on one drum, a separate channel for each shot and the signals on each drum can be added together and recorded on a still further channel.

The recording, adding and overall time correlation of the received seismic signals are highly successful with my invention, since precise time relations can be maintained. The use of radio to communicate with trucks carrying the equipment further aids in avoiding errors and speeds the survey. When a survey can be performed quicker, money is saved. If sufficient flexibility is inherent in the recording and processing equipment, then near-optimum results can be obtained for maximum usefulness of the survey. All these features and others make my invention a significant improvement to seismic exploration.

The present invention can be practiced in several forms and with many types of apparatuses. These changes and adaptations are obvious to one skilled in the art from the teachings of the specification of one embodiment and are to be included as part of the invention, as defined by the appended claims.

I claim:
1. A system for seismic prospecting comprising:
a number of pulsers;
each of said pulsers comprising,
 a housing having a top and integral side walls, an open face opposite said top having an area large in relation to the maximum horizontal area bounded by said side walls to be disposed on the ground, and being heavily weighted for firm contact with the ground,
 a flexible, fluid tight diaphragm over said face, secured in fluid tight relation to said housing and situated thereon for placement in solid pressure-transmitting relation to the ground,
 a substantially incompressible liquid in said housing,
 an exploding electric plasma firing means disposed in said housing to receive a high electric current that causes a pressure impulse in said liquid to be coupled through said diaphragm to the ground for transmission to a seismic receiver;
separate electrical power supply means for each pulser for supplying a high electric current to said exploding electric plasma firing means in each of said pulsers;
means at each pulser responsive to a firing signal for triggering said current supply means to transfer said high current to said exploding electric plasma firing means, creating the pressure impulse at a precise time;
each said housing being shaped to concentrate the pressure impulse in the direction of said open face and to the ground through said diaphragm thereof;
means for generating a firing signal, said means being coupled to each of said triggering means and including control means for controlling the arrival of said firing signal at each of said triggering means and, thereby, the firing times of said pulsers; and
means for receiving and recording the seismic wave produced by said pulsers.

2. The device, as described in claim 1, wherein:
said firing signal generator means is connected to and is activated by said recording means, and said control means transmits said firing signals simultaneously to the several trigger means for firing said pulsers simultaneously at the beginning of a recording cycle and to repeat said firing at the beginning of said recording cycle.

3. The device, as described in claim 1, wherein:
said firing signal generator is connected to and is activated by said recording means at the beginning of a recording cycle, and said control means transmits said firing signals sequentially to at least two of said triggering means for sequentially firing two or more of said pulsers.

4. The device, as described in claim 1, wherein:
said firing signal generator is connected to and is activated by said recording means at the beginning of a recording cycle, and said control means transmits said firing signals sequentially to at least two and simultaneously to at least two of said triggering means for sequential firing of two or more of said pulsers and simultaneous firing of some of said pulsers.

5. A system for seismic prospecting comprising:
a number of seismic impulse producing stations;
each of said stations comprising,
 a housing having a top and integral side wall, an open face opposite said top and having an area large in relation to the maximum horizontal area bounded by said side walls to be disposed on the ground, and being heavily weighted for firm contact with the ground,
 a flexible, fluid tight diaphragm over said face, secured in fluid tight relation to said housing and situated thereon for placement in solid pressure-transmitting relation to the ground,
 a substantially incompressible liquid in said housing,
 an exploding electric plasma firing means disposed in said housing to receive a high electric current that causes a pressure impulse in said liquid to be coupled through said diaphragm to the ground for transmission to a seismic receiver;
separate electrical power supply means for each said station for supplying a high electric current to said exploding electric plasma firing means;
means at each said station responsive to a firing signal for triggering said current supply means to transfer said high current to said firing means, creating the pressure impulse at a precise time;
said housing being shaped to concentrate the pressure impulse in the direction of each said open face and to the ground through said diaphragm;
means for generating a firing signal, said means being coupled to each of said triggering means and including control means for controlling the arrival of said firing signal at each of said triggering means and, thereby, the firing times at said stations; and
means for receiving and recording the seismic wave produced by said plasma firing means at the respective stations,
 said recording means having parallel recording tracks and switching means for selectively coupling said tracks to the receiving means, said signal generator being connected to said recording means to produce a firing signal at a precise point in reference to said recording tracks.

6. The system, as described in claim 5, wherein:
each of said stations includes a vehicle mounting at least one of said housings, said vehicles having means for firmly placing the respective housing in contact with the ground and thereby coupling the respective diaphragm solidly to the ground;
said control means includes radio links with each of said stations for use in triggering said electric firing means in a desired time relation.

7. A method for using an exploding electric plasma pressure impulse producing device for geophysical prospecting, comprising the steps of:
placing said device in firm contact with the ground,
initially firing said device in correlation with the initiation of a recording cycle on a recording device having cyclic operation and connected to the output of a seismic receiver means to produce an electric plasma and create a pressure impulse said impulse being transmitted to the ground,
receiving the seismic signal from said transmitted pressure impulse to said receiver,
recording the received seismic signal during said recording cycle on said recording device,
repeat firing said device from the same effective location and at the same relative time during the next recording cycle,
receiving the seismic signal from said repeat firing,
playing back the recorded seismic signal from the initial firing during said next recording cycle,
adding the received seismic signal from said repeat firing to the said played-back signal from said initial firing during said second cycle, to accentuate the repetitive pulse from a horizon and reduce undesirable noise signals, and,
recording the resulting summed signals during the said next recording cycle.

8. A method for using a group of exploding electric plasma pressure impulse devices for geophysical prospecting, comprising the steps of:
placing said devices in firm contact with the ground at spaced locations,
storing at each of said locations a large quantity of electric energy,
generating a firing pulse in correlation with the initiation of a recording cycle on a recording device having cyclic operation and connected to the output of a seismic receiver means,
transmitting said firing pulse to each of said locations and there triggering by said transmitted pulses the rapid transfer of said stored electric energy as a high-intensity direct current to the corresponding devices to produce solely by said electric energy an electric plasma within said devices and create pressure impulses, said impulses being transmitted to the ground,
receiving the seismic signal from said impulses at said receiver means, and
recording the received seismic signal on said recording device during said recording cycle.

9. A method for using a group of exploding electrical plasma pressure impulse devices for geophysical prospecting, comprising the steps of:
placing said devices in firm contact with the ground at spaced locations,
storing at each of said locations a large quantity of electric energy,
generating an initial firing pulse in correlation with the initiation of a first recording cycle on the recording means having cyclic operation and connected to the output of a seismic receiver means,
transmitting said firing pulse to each of said locations and there triggering by said transmitted pulses the rapid transfer of said stored electric energy as a high-intensity direct current to the corresponding devices to produce solely by said electric energy an electric plasma within said devices and create initial pressure impulses, said impulses being transmitted to the ground,
receiving the seismic signal from said initial impulses at said receiver means,
recording the received seismic signal on said recording device during said first recording cycle,
again storing electric energy at each of said locations,
generating a subsequent firing pulse at the same relative time during the next recording cycle, transmitting the subsequent firing pulse to said locations, and thereby again triggering the rapid transfer of electric energy to the corresponding devices to effect repeat firings thereof, and
receiving the seismic signal from said repeat firings and recording the latter received signal.

References Cited by the Examiner
UNITED STATES PATENTS

| | | | |
|---|---|---|---|
| 2,167,536 | 7/1939 | Suits | 340—12 |
| 2,559,227 | 7/1951 | Rieber | 181—.53 |
| 2,772,746 | 12/1956 | Merten | 181—.53 |
| 2,851,121 | 9/1958 | McCollum | 181—.5 |
| 3,022,851 | 2/1962 | Hasbrook | 181—.53 |
| 3,024,861 | 3/1962 | Clynch | 181—.53 |
| 3,062,315 | 11/1962 | Herzog | 181—.53 |
| 3,064,753 | 11/1962 | McClure | 181—.53 |
| 3,106,982 | 10/1963 | Wade | 181—.53 |
| 3,167,014 | 1/1965 | Kopito | 102—28 |

FOREIGN PATENTS
608,169  11/1960  Canada.

BENJAMIN A. BORCHELT, *Primary Examiner.*

SAMUEL FEINBERG, *Examiner.*

G. H. GLANZMAN, *Assistant Examiner.*